(12) United States Patent
Khazeni et al.

(10) Patent No.: US 9,645,670 B2
(45) Date of Patent: May 9, 2017

(54) SENSING FRAME AVERAGING FOR CANCELLING DISPLAY NOISE IN SIMULTANEOUS DISPLAY AND TOUCH SENSING

(71) Applicant: SYNAPTICS INCORPORATED, San Jose, CA (US)

(72) Inventors: Kasra Khazeni, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 40 days.

(21) Appl. No.: 14/871,473

(22) Filed: Sep. 30, 2015

(65) Prior Publication Data

US 2017/0090641 A1    Mar. 30, 2017

(51) Int. Cl.
G06F 3/041     (2006.01)
G06F 3/044     (2006.01)

(52) U.S. Cl.
CPC ............ *G06F 3/0416* (2013.01); *G06F 3/044* (2013.01); *G06F 3/0412* (2013.01); *G06F 2203/04108* (2013.01)

(58) Field of Classification Search
CPC ...... G06F 3/041; G06F 3/0412; G06F 3/0414; G06F 3/0416; G06F 3/044; G06F 2203/04106
See application file for complete search history.

(56) References Cited

U.S. PATENT DOCUMENTS

| | | |
|---|---|---|
| 7,417,441 B2 | 8/2008 | Reynolds |
| 7,583,092 B2 | 9/2009 | Reynolds et al. |
| 2008/0062148 A1 | 3/2008 | Hotelling et al. |
| 2008/0157893 A1* | 7/2008 | Krah ............... G06F 3/0418 331/177 R |
| 2010/0001973 A1 | 1/2010 | Hotelling et al. |
| 2010/0085325 A1* | 4/2010 | King-Smith ........ G06F 3/03545 345/174 |
| 2010/0193257 A1 | 8/2010 | Hotelling et al. |
| 2010/0194695 A1 | 8/2010 | Hotelling et al. |
| 2011/0057890 A1* | 3/2011 | Goo ............... G06F 3/0412 345/173 |

(Continued)

OTHER PUBLICATIONS

Phillippe Lambinet, FOGALE nanotech, presentation materials dared, May 22, 2013, France.

*Primary Examiner* — Joe H Cheng
(74) *Attorney, Agent, or Firm* — Patterson + Sheridan, LLP

(57) ABSTRACT

Techniques for removing display-based corrupting components from a capacitive sensing signal when display and capacitive sensing is performed at or nearly at the same time. A routing carrying display related signals (e.g., a source signal for sub-pixel updating) may induce a corrupting current into a routing for carrying capacitive sensing signals. This corrupting current would reduce the ability to determine presence of an input object via the sensing signal. Therefore, the corrupting signal is effectively removed by averaging sensing signals from two consecutive frames together. Because displays perform frame inversion, in which the voltage polarity provided to a sub-pixel for updates is reversed each frame, the corrupting current reverses in polarity each frame. Therefore, adding two subsequent frames together cancels out the corrupting signal.

20 Claims, 6 Drawing Sheets

(56) References Cited

U.S. PATENT DOCUMENTS

| | | | |
|---|---|---|---|
| 2011/0284949 A1 | 11/2011 | Meng et al. | |
| 2011/0298746 A1 | 12/2011 | Hotelling | |
| 2012/0139846 A1* | 6/2012 | Krah | G06F 3/044 345/173 |
| 2012/0182251 A1 | 7/2012 | Krah | |
| 2012/0200524 A1* | 8/2012 | Vallis | G06F 3/044 345/174 |
| 2013/0076646 A1* | 3/2013 | Krah | G06F 3/0414 345/173 |
| 2013/0215075 A1 | 8/2013 | Lee et al. | |
| 2013/0321296 A1 | 12/2013 | Lee et al. | |
| 2014/0022211 A1* | 1/2014 | Karpin | G06F 3/044 345/174 |
| 2014/0062952 A1* | 3/2014 | Savitsky | G06F 3/044 345/174 |
| 2015/0091843 A1 | 4/2015 | Ludden | |
| 2015/0212623 A1* | 7/2015 | Hatano | G06F 3/044 345/174 |

* cited by examiner

SENSING FRAME AVERAGING FOR CANCELLING DISPLAY NOISE IN SIMULTANEOUS DISPLAY AND TOUCH SENSING

BACKGROUND

Field of the Disclosure

Embodiments generally relate to input sensing and, in particular, to cancelling display noise in simultaneous display and touch sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensor devices may include display elements that are driven for updates simultaneously with performing proximity sensing. A routing carrying display related signals (e.g., a source signal for sub-pixel updating) to the display elements may induce a corrupting current into a routing for carrying proximity sensing signal. This corrupting current would reduce the ability to determine presence of an input object via the sensing signal.

SUMMARY

A processing system configured for simultaneously updating a display and performing capacitive sensing is provided. The processing system includes a source driver configured to drive a source line with a first source driver voltage during a first time period and to receive resulting signals on a routing trace coupled to a sensor electrode during a second time period that at least partially overlaps with the first time period, the routing trace and the source line being routed proximate each other. The processing system also includes an interference remover configured to acquire first resulting signals during a first display update period and second resulting signals during a second display update period, and to remove display interference from the second resulting signals by combining the first resulting signals and the second resulting signals. First display signals provided for display updates during the first display update period are frame-inverted with respect to second display signals provided for display updates during the second display update period.

An input device configured for simultaneously updating a display and performing capacitive sensing is provided. The input device includes a display element coupled to a source line. The input device also includes a sensor electrode coupled to a routing trace, the routing trace and the source line being routed proximate each other. The input device further includes a processing system coupled to the source line and the routing trace. The processing system includes a source driver configured to drive a source line with a first source driver voltage during a first time period and to receive resulting signals on a routing trace coupled to a sensor electrode during a second time period that at least partially overlaps with the first time period, the routing trace and the source line being routed proximate each other. The processing system also includes an interference remover configured to acquire first resulting signals during a first display update period and second resulting signals during a second display update period, and to remove display interference from the second resulting signals by combining the first resulting signals and the second resulting signals. First display signals provided for display updates during the first display update period are frame-inverted with respect to second display signals provided for display updates during the second display update period.

A method for simultaneously updating a display and performing capacitive sensing is provided. The method includes driving a source line with a first source driver voltage during a first time period. The method also includes receiving resulting signals on a routing trace coupled to a sensor electrode during a second time period that at least partially overlaps with the first time period, the routing trace and the source line being routed proximate each other. The method further includes acquiring first resulting signals during a first display update period and second resulting signals during a second display update period. The method also includes removing display interference from the second resulting signals by combining the first resulting signals and the second resulting signals. First display signals provided for display updates during the first display update period are frame-inverted with respect to second display signals provided for display updates during the second display update period.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide techniques for removing display-based corrupting components from a capacitive sensing signal when display and capacitive sensing is performed at or nearly at the same time. A routing carrying display related signals (e.g., a source signal for sub-pixel updating) may induce a corrupting current into a routing for carrying capacitive sensing signals. This corrupting current would reduce the ability to determine presence of an input object via the sensing signal. Therefore, the corrupting signal is effectively removed by averaging sensing signals from two consecutive frames together. Because displays perform frame inversion, in which the voltage polarity provided to a sub-pixel for updates is reversed each frame, the corrupting current reverses in polarity each frame. Therefore, adding two subsequent frames together cancels out the corrupting signal.

Figure 1:
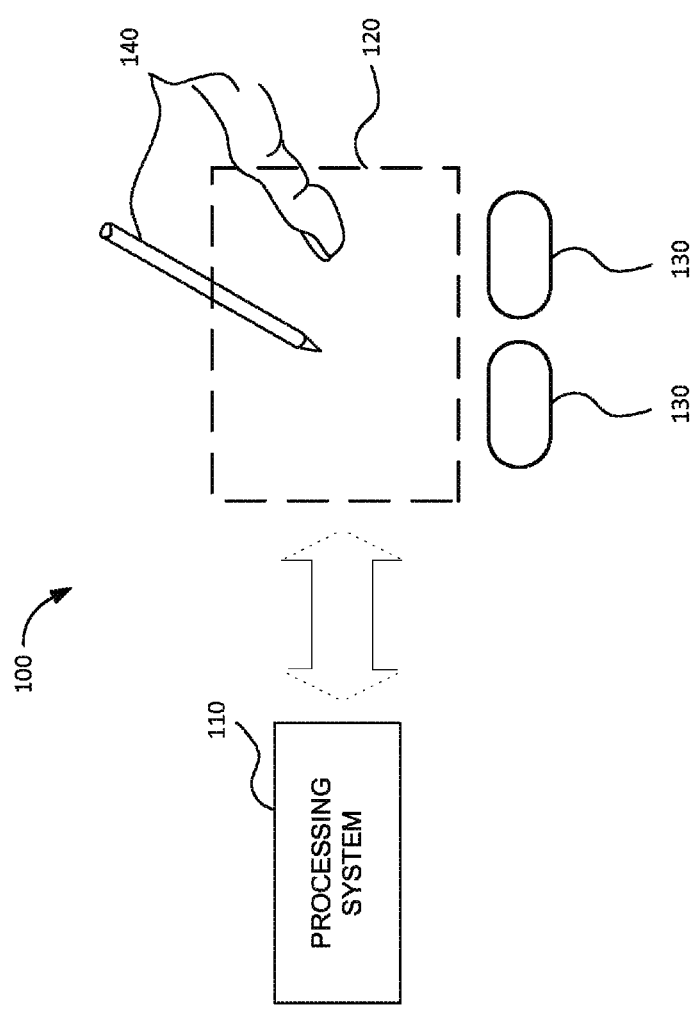
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
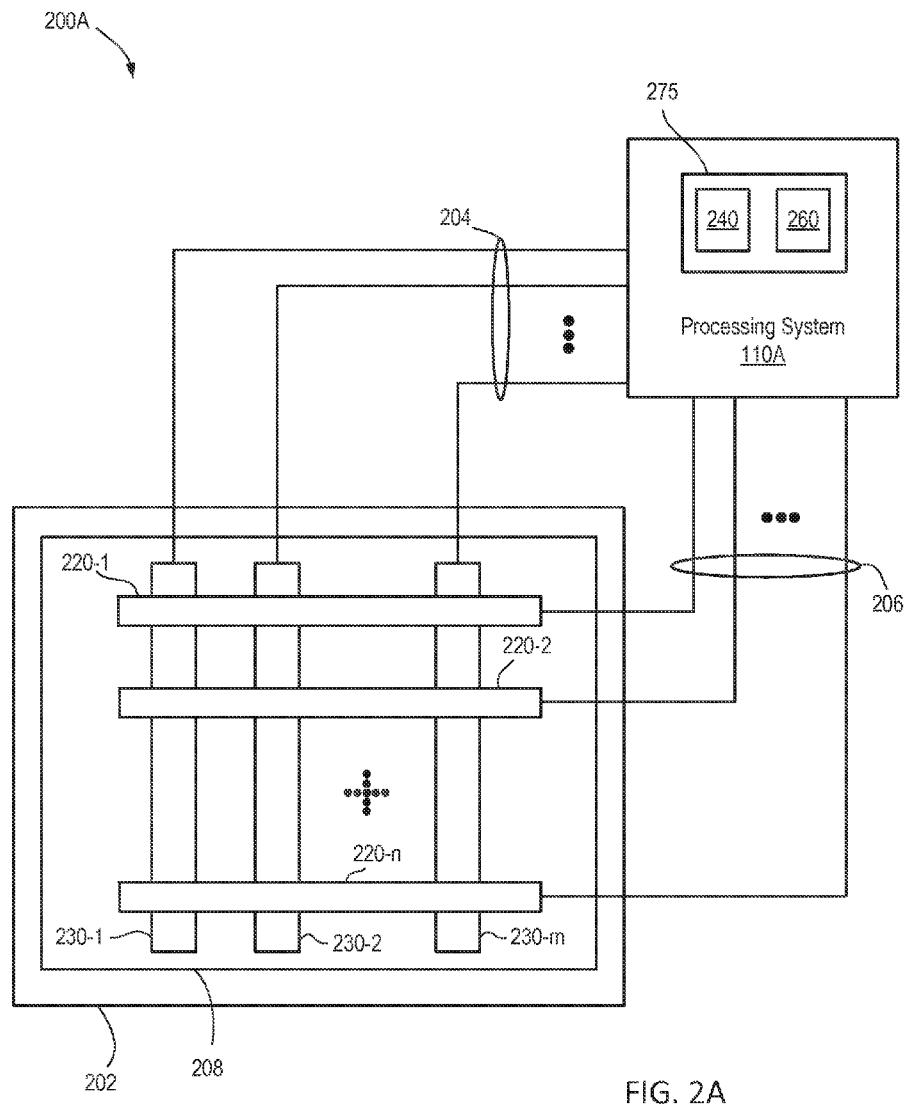
FIG. 2A is a block diagram depicting a capacitive sensor device according to an example.

FIG. 2A is a block diagram depicting a capacitive sensor device 200A according to an example. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.).

The sensor electrode collection 208 is disposed on a substrate 202 to provide the sensing region 120. The sensor electrode collection 208 includes sensor electrodes disposed on the substrate 202. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). In some embodiments, sensor electrodes 220 may be transmitter electrodes and sensor electrodes 230 may be receiver electrodes. The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
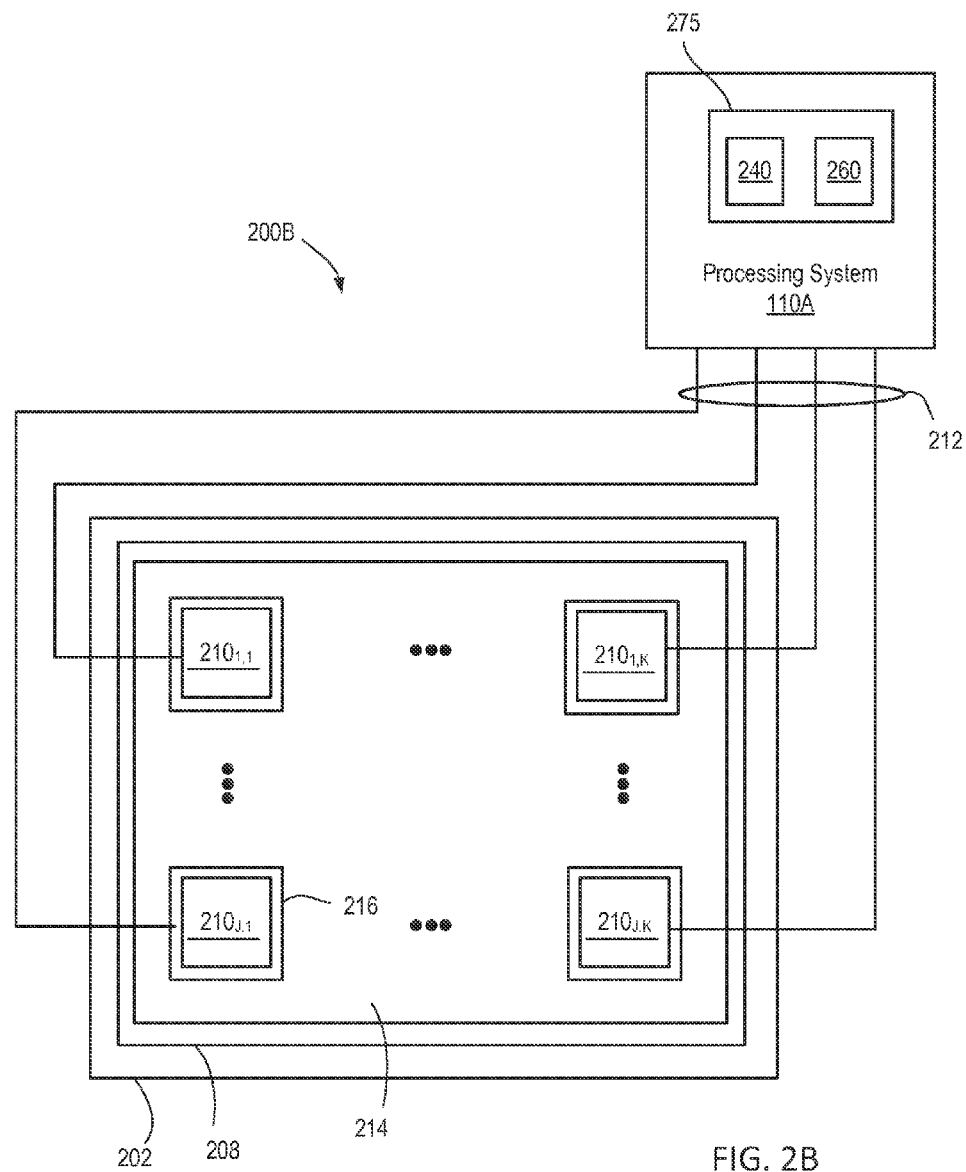
FIG. 2B is a block diagram depicting another capacitive sensor device according to an example.

FIG. 2B is a block diagram depicting a capacitive sensor device 200B according to an example. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). The sensor electrodes 210 are ohmically isolated from each other and the grid electrode 214. The sensor electrodes 210 can be separated from the grid electrode 214 by a gap 216. In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. In various embodiments, the grid electrode(s) is optional and may not be included. Similar to the capacitive sensor device 200A, the processing system 110A can operate the sensor electrodes 210 and the grid electrode 214 according to a plurality of excitation schemes, including excitation scheme(s) for transcapacitive sensing and/or absolute capacitive sensing.

In some examples, the sensor electrodes 210 and the grid electrode 214 can be disposed on separate layers of the substrate 202. In other examples, the sensor electrodes 210 and the grid electrode 214 can be disposed on a single layer of the substrate 202. The sensor electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The sensor electrodes 210 are coupled to the processing system 110A by conductive routing traces 212. The processing system 110A can also be coupled to the grid electrode 214 through one or more routing traces (not shown for clarity). The processing system 110A is coupled to the sensor electrodes 210 through the conductive routing traces 212 to implement the sensing region 120 for sensing inputs.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110A excites or drives sensing elements of the sensor electrode collection 208 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110A drives sensing element(s) of the sensor electrode collection 208 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110A can determine measurement(s) of capacitance from the sensed charge. In another example, the processing system 110A drives sensing element(s) of the sensor electrode collection 208 with charge and senses resulting respective voltage on sensing element(s). That is, the sensing signal is a signal to cause accumulation of charge (e.g., current signal) and the resulting signal is a voltage signal. The processing system 110A can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110A can include a sensor module 240 and a determination module 260. The sensor module 240 and the determination module 260 comprise modules that perform different functions of the processing system 110A. In other examples, different configurations of one or more modules can perform the functions described herein. The sensor module 240 and the determination module 260 can include circuitry 275 and can also include firmware, software, or a combination thereof operating in cooperation with the circuitry 275.

The sensor module 240 selectively drives sensing signal(s) on one or more sensing elements of the sensor electrode collection 208 over one or more cycles ("excitation cycles") in accordance with one or more schemes ("excitation schemes"). During each excitation cycle, the sensor module 240 can selectively sense resulting signal(s) from one or more sensing elements of the sensor electrode collection 208. Each excitation cycle has an associated time period during which sensing signals are driven and resulting signals measured.

In one type of excitation scheme, the sensor module 240 can selectively drive sensing elements of the sensor electrode collection 208 for absolute capacitive sensing. In absolute capacitive sensing, the sensor module 240 drives selected sensing element(s) with an absolute sensing signal and senses resulting signal(s) from the selected sensing element(s). In such an excitation scheme, measurements of absolute capacitance between the selected sensing element(s) and input object(s) are determined from the resulting signal(s). In an example, the sensor module 240 can drive selected sensor electrodes 220, and/or selected sensor electrodes 230, with an absolute sensing signal. In another example, the sensor module 240 can drive selected sensor electrodes 210 with an absolute sensing signal.

In another type of excitation scheme, the sensor module 240 can selectively drive sensing elements of the sensor electrode collection 208 for transcapacitive sensing. In transcapacitive sensing, the sensor module 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 240 can drive the sensor electrodes 230 with transmitter signal(s) and receive resulting signals on the sensor electrodes 220. In another example, the sensor module 240 can drive selected sensor electrodes 210 with transmitter signal(s), and receive resulting signals from others of the sensor electrodes 210.

In any excitation cycle, the sensor module 240 can drive sensing elements of the sensor electrode collection 208 with other signals, including reference signals and guard signals. That is, those sensing elements of the sensor electrode collection 208 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal or the absolute capacitive sensing signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor module 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor module 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110A can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110A, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

Figures 3, 4, 5:
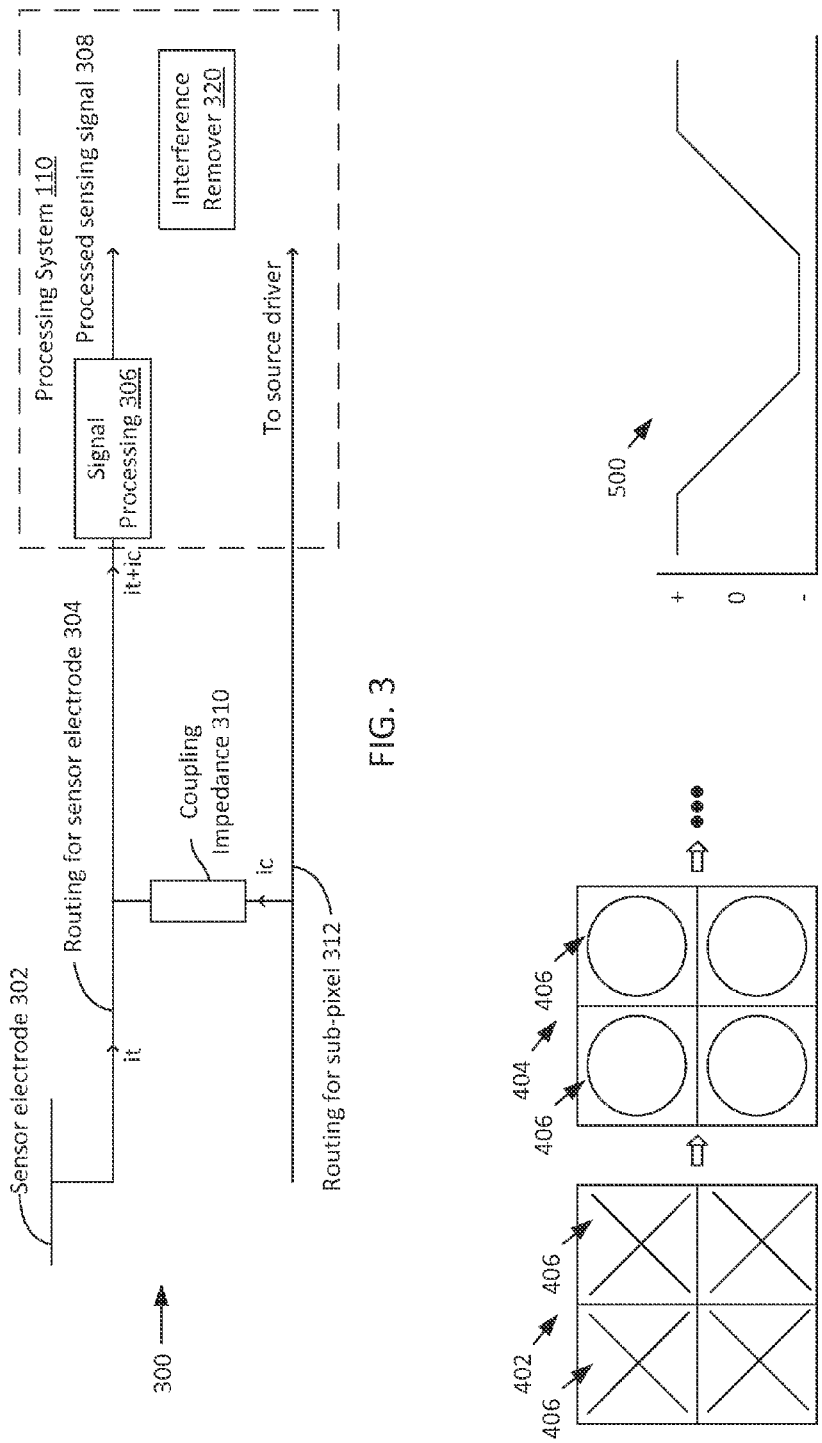
FIG. 3 is a schematic diagram of a routing configuration, according to an example.
FIG. 4 is a diagram that illustrates aspects of frame inversion, according to an example.
FIG. 5 is a graph that illustrates the effect of frame inversion for a particular sub-pixel, according to an example.

FIG. 3 is a schematic diagram of a routing configuration 300, according to an example. As shown, the routing configuration 300 includes a routing 304 for a sensor electrode 302 (which may, for example, be a sensor electrode such as sensor electrodes 220 or sensor electrodes 230 of FIG. 2A, or sensor electrodes 210 of FIG. 2B) and a routing 312 for a sub-pixel, as well as a sensor electrode 302. Processing system 110 is coupled to sensor electrode routing 304 and sub-pixel routing 312.

The sensor electrode routing 304 electrically couples sensor electrode 302 to signal processing unit 306 (which may be a portion of processing system 110). The sub-pixel routing 312 electrically couples a display sub-pixel (not shown) to a source driver (also not shown), which may be a part of processing system 110 of FIG. 1. Coupling impedance 310 represents a capacitive coupling between sensor electrode routing 304 and sub-pixel routing 312. The coupling impedance 310 exists due to the proximity of these two elements to each other.

In operation, processing system 110 drives sensor electrode 302 for sensing. In response, the sensor electrode 302 provides a signal to signal processing unit 306, which processes the signal to generate processed sensing signal 308, which may be processed by other elements in processing system 110 to determine presence of an input object 140 proximate to sensor electrode 302. Driving sensor electrode 302 may comprise varying the voltage at the sensor electrode 302 with respect to the input object 140 so that a current is induced on sensor electrode routing 304 that is dependent on the degree of capacitive coupling between the input object 140 (if present and/or capacitively coupled to sensor electrode 302) and sensor electrode 302. The current induced in sensor electrode routing 304 in response to driving the sensor electrode 302 is labeled as "if" in FIG. 3. Note that driving the voltage at sensor electrode 302 with respect to the input object 140 might be done by maintaining the sensor electrode 402 at a fixed voltage with respect to system ground. This may be done by providing a modulated power supply that modulates the power supply and ground voltages of input device 100 with respect to an external voltage such as voltage associated with an input object 140.

The signal processing system 306 processes the current signal received on sensor electrode routing 304 to generate a processed sensing signal 308 for further processing including determination of presence of an input object 140. The signal processing system 306 includes various elements that perform functions such as sampling through charge integration, signal filtering, demodulation, and the like, and can include elements such as an operational amplifier with capacitive feedback, a demodulator, a filter, and other mechanisms.

Sub-pixel routing 312, which provides signals for updating display elements (not shown), may be near to sensor electrode routing 304. When a signal is driven onto sub-pixel routing 312 by a source driver, some current is driven onto sensor electrode routing 304 due to coupling impedance 310. This current is referred to as a "corrupting current" ic, and flows to sensor electrode routing 304.

The current that arrives at signal processing unit 306 is thus a combination of the corrupting current "ic" from sub-pixel routing 312 and the current from sensor electrode "it". (Note that corrupting current may come from a most-nearby sub-pixel routing trace, as well as from other traces that are nearby). Thus, the processed sensing signal 308 is affected by current induced by display updates that is unrelated to an input object 140 near sensor electrode 302. By affecting what is processed by signal processing unit 306, the corrupting current hinders the ability of processing system 110 to detect presence of an input object 140.

To improve ability to detect presence of an input object 140, techniques for removing the corrupting current are provided herein. These techniques help with making the processed signal to accurately reflect an input object 140 near sensor electrode 302. In general, the techniques involve averaging consecutive sensing frames together to cancel out the corruption current, taking advantage of the fact that displays typically perform frame inversion. Frame inversion typically involves altering the polarity of voltage driven by a source driver with respect to a middle, "zeroed" voltage, in order to refrain from causing a malfunction of the display elements. Display elements (such as a liquid crystal material) can be fouled by repeated application of voltage of the same polarity. The interference remover 320 of processing system 110 may perform at least a portion of the techniques for removing the corrupting current. The interference remover 320 may comprise, for example, a specifically designed interference remover circuit configured to perform the functionality described herein, or a programmable circuit (e.g., a microcontroller) programmed to perform the functionality described herein. Other technically feasible embodiments are possible as well. The techniques for removing corrupting current are described below.

FIG. 4 is a diagram that illustrates aspects of frame inversion, according to an example. FIG. 4 illustrates a first frame portion 402 and a second frame portion 404. Each frame portion is associated with a particular frame and shows only four sub-pixels of a display, but it should be understood that frame inversion is generally applied to substantially each sub-pixel in a display. The frame for the second frame portion 404 is immediately subsequent to the frame for the first portion 402.

For the first frame portion 402, each of the sub-pixels 406 illustrated is driven with a voltage having a first polarity (i.e., above or below a middle "zero" voltage), indicated with an "X." For the second frame portion 404, each of the sub-pixels 406 is driven with a voltage having a second polarity that is opposite from the first polarity, indicated with an "O." In accordance with frame inversion, frames of the display alternate between states like the first frame 402 and the second frame 404. In other words, each frame, a sub-pixel is driven with a voltage that is opposite in polarity to the voltage with which that sub-pixel was driven the previous frame.

Note that although sub-pixels change polarity every frame, it is not necessary for all sub-pixels (or even for neighboring sub-pixels) of any particular frame inversion scheme to change from and to the same polarities. Thus, while four neighboring sub-pixels 406 are illustrated in FIG. 4 as each having the same polarity, it should be understood that neighboring sub-pixels may have different polarities in any particular frame. Schemes such as line inversion, dot inversion, and other more complex schemes are known and are possible. Each such scheme is considered to be a "frame inversion" scheme in that polarity for any particular sub-pixel is reversed each frame.

FIG. 5 is a graph 500 that illustrates the effect of frame inversion for a particular sub-pixel, according to an example. As can be seen, voltage for the sub-pixel is at a positive voltage (represented by "+"), then transitions to a negative voltage (represented by "+"), and then back to the positive voltage ("+").

When voltage transitions to a positive voltage for a particular sub-pixel, the sub-pixel routing 312 to that sub-pixel induces a current flow in sensor electrode routing 304 that is equal to C dV/dt, where C is the capacitance of the capacitive coupling (coupling impedance 310) and V is the voltage difference between the voltage at the sub-pixel routing 312 and the sensor electrode routing 304. Then, when voltage transitions to a negative voltage for the next frame and the same sub-pixel, the sub-pixel routing 312 to that sub-pixel induces a current flow in sensor electrode routing 304 that is equal to −C dV/dt. If the brightness value for the sub-pixel is the same or substantially the same (i.e., if the display image is not changing quickly), then the voltage V is the same or substantially the same for the two consecutive frames. This means that the amount of corrupting current injected by display elements is roughly equal but of opposite polarity on consecutive frames.

Figure 6:
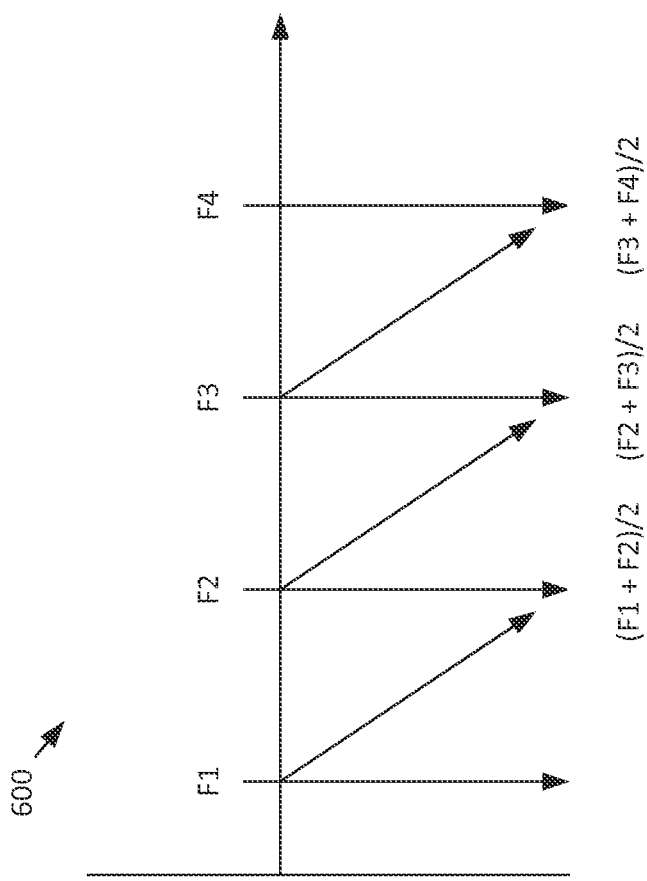
FIG. 6 is a graph illustrating frame averaging for cancellation of corruption current, according to an example.

FIG. 6 is a graph 600 illustrating frame averaging for cancellation of corrupting current, according to an example. The graph 600 illustrates four frames, labeled $F_1$, $F_2$, $F_3$, and $F_4$. These frames are sensing and display update frames in which one "sensing frame" (or capacitive frame) and one "display frame" or "display update frame" occurs.

Referring momentarily to FIG. 3, note that signal processing unit 306 may convert current signals received from sensor electrode 302 to a digital signal. The digital signal value is generally dependent on the current signal received at signal processing unit 306 and thus may be said to have a component associated with it and a component associated with ic. Digital components of the processing system 110 may receive the digital signal and process the digital signal further to determine location of an input object 140.

Referring back to FIG. 6, to remove corrupting current from the digital signal, processing system 110 (specifically, interference remover 320) averages two sensing frames together. Averaging two sensing frames includes, for each capacitive pixel, adding output values representative of the current received, and dividing by two. Because the corrupting current changes sign each frame, the corrupting current from two consecutive frames, when summed, adds to 0. Mathematically, the average value for a capacitive pixel for two consecutive frames is:

$$\frac{\left(it + C\frac{dV}{dt}\right) + \left(it - C\frac{dV}{dt}\right)}{2},$$

which equals $$\frac{2it}{2},$$

which equals it, which has no contribution from the display-originating corrupting current. For determining presence of an input object 140, the averaged frame is used in place of the later of the frames that are averaged together. For example, if an earlier frame F1 is averaged with a later frame F2, the averaged frame is used in place of the later frame F2 for purposes of determining presence of an input object 140.

Note that a first capacitive frame of sensing data has no prior capacitive sensing frame with which to perform averaging, so, in some embodiments, when sensing begins, there is one frame of lag where no sensing data is output—the first frame is dropped and not used for determining presence of an input object (except indirectly through averaging with the next frame). In other embodiments, the first frame is not dropped, and is used to determine presence of an input object despite possibly including components from noise.

Note also that sensing and display updating may be performed "simultaneously." The term "simultaneously" means that touch sensing for one or more sensor electrodes of the input device 100 is performed at the same time as display updates with one or more of the display elements of the input device 100. Sensing and display updating may alternatively be performed at different times, but in a single, common frame in which display updates and sensing is performed. Sensing and display updating may alternatively be performed in separate but at least partially overlapping periods. In other words, display updating may be performed during a first period and sensing may be performed during a second period, where the first period and second period at least partially overlap.

Sensing electrodes may be integrated with display elements. For example, display elements may include two electrodes that form a capacitor with a material between the two electrodes that varies characteristics related to light transmitted through that material based on a voltage across that material. One of those electrodes provides a reference voltage against which the other electrode may apply a voltage to set the variable characteristic (e.g., light polarization direction) of the transmissive material. Setting the variable characteristic of the transmissive material may be referred to herein as "updating the display element."

Sensing and display updating may involve updating display elements while also sensing with sensing elements integrated with those display elements. Alternatively or additionally, sensing may involve updating display elements while sensing with sensing elements other than those that are integrated with the display elements, as well as sensing with sensing elements while updating display elements other than those that are integrated with the sensing elements.

Figure 7:
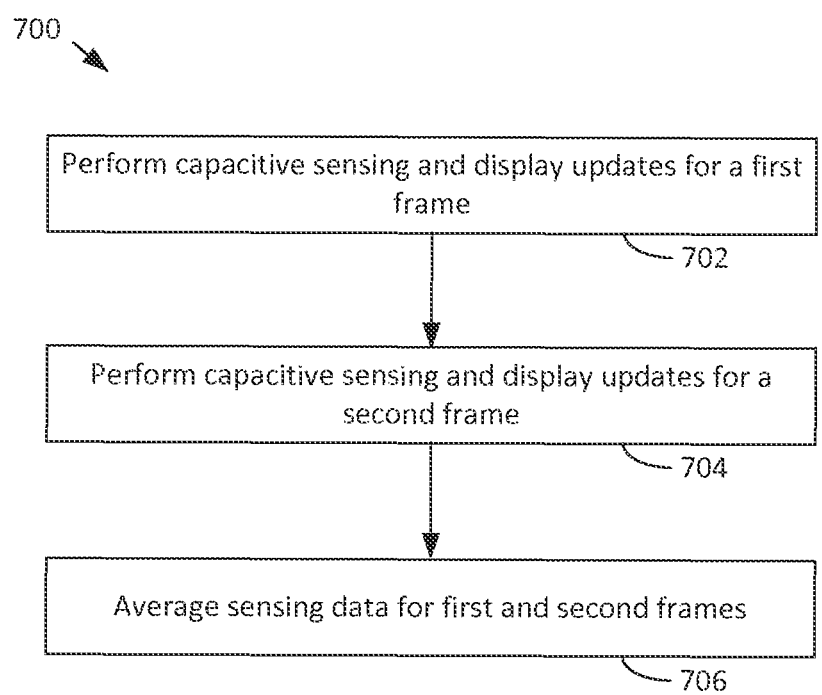
FIG. 7 is a flow diagram of a method for removing corrupting contribution generated by display elements from a sensing signal, according to an example.

FIG. 7 is a flow diagram of a method 700 for removing corrupting contribution generated by display elements from a sensing signal, according to an example. Although described with respect to the system of FIGS. 1-3, those of skill in the art will understand that any system configured to perform the steps in various alternative orders is within the scope of the present disclosure.

As shown, the method 700 begins at step 702, where processing system 110 performs capacitive sensing and performs display updating in a first frame. Capacitive sensing includes driving electrodes with signal and receiving signals in return. Display updating includes driving a voltage to a display element and may induce a corrupting current on a sensor electrode routing that carries the received sensing-related signals. The sensing-related signals may thus include data indicative of an input object 140 near the driven sensor electrode and also includes a corrupting current related to the display signal.

At step 702, processing system 110 performs capacitive sensing and display updating in a second frame. The second frame is performed similarly to a first frame but for display updating, frame inversion occurs. This means that the voltage polarity for each display sub-pixel is the inverse of the voltage polarity for the sub-pixels in the prior (first) frame.

At step 704, processing system 110 averages the two sensing frames to cancel out corrupting current. Averaging two sensing frames involves, for each capacitive pixel, adding the corresponding value for the first frame to the value for the second frame together and dividing by two. Note that a value approximately equal to this average value could be used as well. Because of the reverse in polarity for the display data, this averaging cancels out the corrupting signal.

Note that in some embodiments, averaging two sensing frames may involve subtracting pixel values for one frame from corresponding pixel values of the other frame and using the average difference, a maximum difference or a minimum difference or a difference between maximum difference and minimum difference as an adjustment for the pixel values of either frame to remove noise. In some embodiments, averaging two sensing frames may be done as a weighted average, where instead of summing pixels and dividing by two, the average skews towards the values of one frame or another, depending on a weight value, which may (or may not) differ between pixel positions. Additionally, in some embodiments, instead of corrected each pixel individually, the correction value for all pixels could be determined based on correction values determined for one or a set of pixels. Note that although some techniques for averaging sensing frames are described herein, other techniques are possible.

The method 700 may be performed continuously, meaning that a first frame may be averaged with a second frame to obtain data for the second frame. Then a second frame may be averaged with a third frame to obtain data for the third frame, and so on.

Advantageously, techniques are provided whereby corrupting signals within a sensing signal is removed. The techniques generally include averaging two frames of sensing data together. Because frame inversion is typically performed for display data, the corrupting current contributed by display updates varies in polarity from negative to positive and back each frame. Thus, the corrupting current varies between positive and negative and back each frame. Averaging consecutive sensing frames together thus cancels out the corrupting currents. These techniques represent simple operations that can be performed digitally and without addition of components and that serve to remove corrupting signals from display elements.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system configured for simultaneously updating a display and performing capacitive sensing, the processing system comprising:
a source driver configured to drive a source line with a first source driver voltage during a first time period and to receive resulting signals on a routing trace coupled to a sensor electrode during a second time period that at least partially overlaps with the first time period, the routing trace and the source line being routed proximate each other; and
an interference remover configured to acquire first resulting signals during a first display update period and second resulting signals during a second display update period, and to remove display interference from the second resulting signals by combining the first resulting signals and the second resulting signals,
wherein first display signals provided for display updates during the first display update period are frame-inverted with respect to second display signals provided for display updates during the second display update period.

2. The processing system of claim 1, wherein the interference remover is configured to combine the first resulting signals and the second resulting signals by:
adding the first resulting signals to the second resulting signals.

3. The processing system of claim 1, wherein the interference remover is configured to combine the first resulting signals and the second resulting signals by:
averaging the first resulting signals with the second resulting signals.

4. The processing system of claim 3, wherein removing the display interference from the second resulting signals comprises:
producing an interference-filtered set of resulting signals corresponding to the second sensing frame.

5. The processing system of claim 1, wherein:
the first resulting signals comprise resulting signals for a first sensing frame; and
the second resulting signals comprise resulting signals for a second sensing frame that is consecutive to the first sensing frame.

6. The processing system of claim 5, wherein:
the second sensing frame is subsequent to the first sensing frame.

7. The processing system of claim 1, wherein:
the source line and the routing trace are disposed in a common layer.

8. The processing system of claim 1, wherein:
the source line and the routing trace are disposed in separate layers; and
the source line is parallel to the routing trace.

9. The processing system of claim 1, wherein the interference remover is further configured to:
drop an initial sensing frame.

10. An input device configured for simultaneously updating a display and performing capacitive sensing, the input device comprising:
a display element coupled to a source line;
a sensor electrode coupled to a routing trace, the routing trace and the source line being routed proximate each other; and
a processing system coupled to the source line and the routing trace, the processing system comprising:
a source driver configured to drive the source line with a first source driver voltage during a first time period and to receive resulting signals on the a routing trace during a second time period that at least partially overlaps with the first time period; and
an interference remover configured to acquire first resulting signals during a first display update period and second resulting signals during a second display update period, and to remove display interference from the second resulting signals by combining the first resulting signals and the second resulting signals,
wherein first display signals provided for display updates during the first display update period are frame-inverted with respect to second display signals provided for display updates during the second display update period.

11. The input device of claim 10, wherein the interference remover is configured to combine the first resulting signals and the second resulting signals by:
adding the first resulting signals to the second resulting signals.

12. The input device of claim 10, wherein the interference remover is configured to combine the first resulting signals and the second resulting signals by:
averaging the first resulting signals with the second resulting signals.

13. The input device of claim 12, wherein removing the display interference from the second resulting signals comprises:
producing an interference-filtered set of resulting signals corresponding to the second sensing frame.

14. The input device of claim 10, wherein:
the first resulting signals comprise resulting signals for a first sensing frame; and
the second resulting signals comprise resulting signals for a second sensing frame that is consecutive to the first sensing frame.

15. The input device of claim 14, wherein:
the second sensing frame is subsequent to the first sensing frame.

16. The input device of claim 10, wherein:
the source line and the routing trace are disposed in a common layer.

17. The input device of claim 10, wherein:
the source line and the routing trace are disposed in separate layers; and
the source line is parallel to the routing trace.

18. The input device of claim 10, wherein the interference remover is further configured to:
drop an initial sensing frame.

19. A method for simultaneously updating a display and performing capacitive sensing, the method comprising:
driving a source line with a first source driver voltage during a first time period;
receiving resulting signals on a routing trace coupled to a sensor electrode during a second time period that at least partially overlaps with the first time period, the routing trace and the source line being routed proximate each other;
acquiring first resulting signals during a first display update period and second resulting signals during a second display update period;
removing display interference from the second resulting signals by combining the first resulting signals and the second resulting signals,
wherein first display signals provided for display updates during the first display update period are frame-inverted with respect to second display signals provided for display updates during the second display update period.

20. The method of claim 19, wherein combining the first resulting signals and the second resulting signals comprises: averaging the first resulting signals with the second resulting signals.

* * * * *